(12) United States Patent
Wittmann et al.

(10) Patent No.: US 8,770,603 B2
(45) Date of Patent: Jul. 8, 2014

(54) DIVIDED ROLL STABILIZER

(75) Inventors: Bernd Wittmann, Pommersfelden (DE); Ralf Mayer, Herzogenaurach (DE); Andrea Lottes, Wachenroth (DE); Norbert Hofmann, Herzogenaurach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/533,197

(22) Filed: Jun. 26, 2012

(65) Prior Publication Data

US 2013/0009374 A1    Jan. 10, 2013

(30) Foreign Application Priority Data

Jul. 7, 2011   (DE) .......................... 10 2011 078 821

(51) Int. Cl.
*B60G 21/055* (2006.01)
(52) U.S. Cl.
USPC .......... 280/124.106; 280/124.107; 280/5.506; 324/207.25; 192/84.92
(58) Field of Classification Search
USPC ............. 280/124.106, 124.107, 5.506–5.508, 280/5.511; 267/41, 47, 48, 188, 191; 324/207.13, 207.25; 73/770, 774, 73/862.193, 779; 192/69.6, 84.92
See application file for complete search history.

(56) References Cited

U.S. PATENT DOCUMENTS

| | | | | |
|---|---|---|---|---|
| 4,796,911 A | * | 1/1989 | Kuroki et al. | 280/5.511 |
| 6,874,792 B2 | * | 4/2005 | Vortmeyer et al. | 280/5.511 |
| 7,832,739 B2 | * | 11/2010 | Pinkos et al. | 280/5.511 |
| 7,837,202 B2 | * | 11/2010 | Taneda et al. | 280/5.511 |
| 2007/0247224 A1 | * | 10/2007 | May | 330/63 |
| 2008/0257070 A1 | * | 10/2008 | May | 73/862.333 |
| 2009/0152824 A1 | | 6/2009 | Grieshaber et al. | |
| 2011/0126639 A1 | * | 6/2011 | Behrens | 73/862.193 |

FOREIGN PATENT DOCUMENTS

| | | |
|---|---|---|
| DE | 102006040109 A1 | 2/2008 |
| DE | 102008001006 A1 | 11/2009 |
| DE | 102009028386 A1 | 2/2011 |
| DE | 102010037555 A1 | 3/2012 |
| WO | 2006013093 | 2/2006 |

* cited by examiner

*Primary Examiner* — Paul N Dickson
*Assistant Examiner* — Darlene P Condra
(74) *Attorney, Agent, or Firm* — Volpe and Koenig, P.C.

(57) ABSTRACT

A divided roll stabilizer of a motor vehicle between whose two stabilizer parts (2a) an actuator (1) can be arranged for a torsion of the stabilizer parts (2a). At least one of the stabilizer parts (2a) is provided with a torsion transmitting connecting part (4a) for connection to the actuator (1), and the connecting part (4a) is magnetically coded.

9 Claims, 4 Drawing Sheets

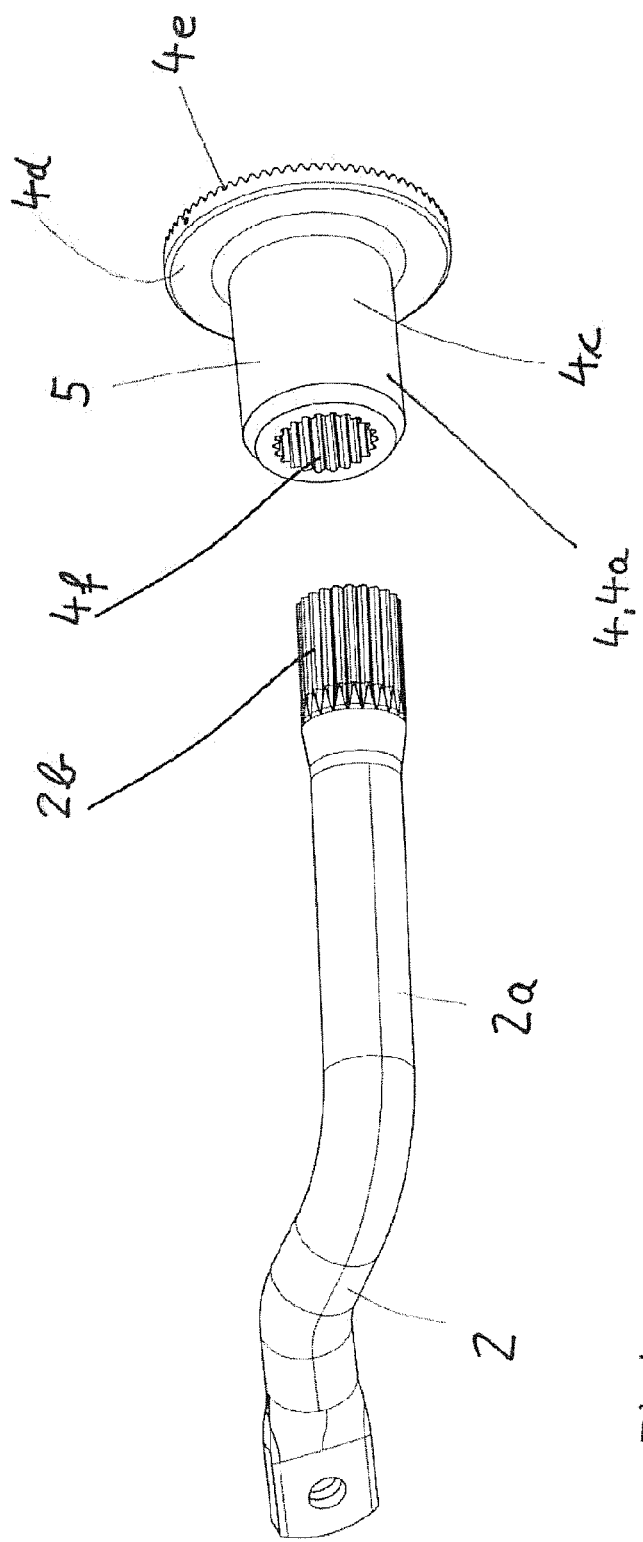

DIVIDED ROLL STABILIZER

CROSS-REFERENCE TO RELATED APPLICATIONS

This application claims the benefit of German Patent Application No. 102011078821.2, filed Jul. 7, 2011, which is incorporated herein by reference as if fully set forth.

BACKGROUND

The present invention relates to a divided roll stabilizer. Roll stabilizers are used for prevented rolling movements of the vehicle body relative to the roadway.

In active roll stabilizers, an actuator can be effectively arranged between two stabilizer parts of the roll stabilizer. The actuator can load both stabilizer parts with a torque. The actuator can have, for example, a hydraulic or electric drive. When the actuator is activated, the two stabilizer parts are rotated relative to each other, applying a torque in the stabilizer parts. The stabilizer parts can be constructed as torsion bar springs.

When the direction of travel is changed quickly, the vehicle body tends to undergo rolling movements that can be compensated with the help of an active roll stabilizer.

So that the actuator can be used selectively, parameters such as a rolling movement of the vehicle body or a transverse acceleration of the vehicle are detected. With these parameters, the actuator can be activated selectively, in order to counteract a rolling movement. For the selective activation of the actuator, typically a measurement and control device is used that allows, with the input-side parameters, an activation of the actuator for a desired compensation of the rolling movement. The actuator loads the connected stabilizer parts with a torque or torsion that counteracts the rolling. The detection of measurement variables, such as transverse acceleration or the rolling movement, requires additional expense for the preparation of active roll stabilizers.

SUMMARY

The objective of the present invention was to provide a divided roll stabilizer that allows this expense to be reduced.

This objective is met by the divided roll stabilizer according to the invention. With the magnetically coded connecting part provided according to the invention, a torsion acting in the divided roll stabilizer can be converted into a magnetic signal; a torsion of the connecting part generates a magnetic signal that is dependent on the applied torsion. The connecting part takes on a dual function in an inventive way: on one hand it takes on the transmission of the effective torsion between the actuator that can be connected and the connected stabilizer part; on the other hand the connecting part generates a magnetic signal that is dependent on an applied torsion. Because the connecting part transmits the full torsion, the magnetic signal of the magnetically coded connecting part is a direct result of the actual effective torsion. The actual effective torsion can be used as a measurement variable for a control device, in order to activate the actuator that can be connected selectively.

The connecting part can be constructed with a flange that can be, on one side, connected to the actuator or locked in rotation with the actuator and, on the other side, can be locked in rotation with the stabilizer part. The flanged connection can be realized by screws that screw the flange to the actuator. Alternative rotationally locked connections could be provided. If the stabilizer part is constructed, for example, as a rod-shaped torsion bar spring, the end of the stabilizer part facing the actuator can be inserted into a receptacle of the flange and locked in rotation with this flange.

The actuator can be arranged effectively between the two stabilizer parts, in order to introduce a generated torsion, on one side, into one stabilizer part and, on the other side, into the other stabilizer part.

The connection parts can be compact, one-piece components; for flange connections, flanges can be prepared as connecting parts that can be produced economically as mass-produced products through non-cutting forming methods.

The connecting parts produced advantageously from ferromagnetic steel according to the invention can be coded magnetically in a simple way and can form a primary sensor as described below in more detail.

The connecting part provided according to the invention is superbly suited for non-contact measurement of the torsion. Torsions can be measured using non-contact methods, wherein a sensor can be provided that has the magnetically coded connecting part as a primary sensor and furthermore a magnetic field sensor as a secondary sensor. The magnetic signal of the primary sensor can be converted by means of the magnetic field sensor into an electric signal and used for a selective activation of the actuator.

This known magnetostrictive measurement principle is disclosed, for example, in publication WO 2006/013093 A2.

In this measurement principle, a change in the magnetic properties is detected.

The Internet site of NCTE includes statements on the magnetostrictive measurement principle that are reproduced below in excerpt and partially modified:

If a ferromagnetic crystal is magnetized, then increasing field strength causes a change in shape of the magnetized crystal, which is called the magnetostrictive effect.

The most important part of magnetostriction is the Joule effect. It is based on the fact that the so-called Weiss fields rotate in the magnetization direction and shift their boundaries. This produces a change in shape of the ferromagnetic body, wherein its volume remains constant. This effect is described with the name "magnetostrictive effect," because the change in volume of common magnetostrictive materials can be disregarded in their effect.

A permanent storage of a "closed" magnetic field structure in ferromagnetic materials is enabled. With the help of magnetically coded measurement shafts, mechanical forces can be measured and determined in real time.

The "Pulsed Current Magnetic Encoding" designates a magnetic coding method. Here, several different signal frequencies with differently pulsed current intensities are guided over a previously determined area of a shaft and in this way "closed" magnetic field structures are programmed into the measurement shaft. This process must be performed only once, because the structures formed in this way are closed and thus represent a stable state.

In contrast to other known methods for measuring forces, this magnetic coding method can measure torques, bending forces, axial forces, radial forces, and shear forces in a non-contact way. Several physical parameters can be simultaneously measured on one and the same coded measurement shaft. In addition, the operating temperature range from −50° C. to over +250° C. is guaranteed. The sensor is insensitive to dirt, oil, water, as well as mechanical shock loads and features a very high measurement accuracy and starting signal linearity of up to 0.05%. The signal bandwidth can be up to 30 kHz and regular maintenance or recalibration of the sensor is not required.

The sensor can comprise a primary sensor and also a secondary sensor.

The primary sensor can be a region of the shaft that is magnetically coded. It is sufficient to perform the coding process only once, advantageously before the shaft is installed at its provided installation location. The mechanical properties of the shaft are not influenced by the coding process. The shaft should be made from ferromagnetic material. In general, industrial steel that contains between 1.5% and 8% Ni is a good base for such a primary sensor. The primary sensor converts the applied forces into a magnetic signal that can be detected on the surface of the shaft. The shaft can be constructed as a solid or hollow shaft.

The secondary sensor is an arrangement of magnetic field sensors that are placed in the direct vicinity of the magnetically coded region of the shaft.

Because the secondary sensors do not contact the shaft, the shaft can rotate freely. The secondary sensor converts changes in the magnetic field—caused by forces in the primary sensor—into electrical information.

The secondary sensor can be placed outside and also inside the shaft, because the sensor signal can be determined on the outside and also on the inside.

The secondary sensor can be formed by coils, in order to measure the magnetic changes in the primary sensor under a torque with high resolution. The coils can be arranged in pairs, in order to allow common-mode rejection through differential measurements and thus to compensate the effects of external magnetic fields. The common-mode rejection mainly involves trouble-free arrangement and good matching of the coils to each other.

For measuring torques, the secondary sensor can be arranged parallel to the axis of the shaft and symmetric relative to the center of the magnetically coded region—that is, of the primary sensor. The coils of the secondary sensor are usually arranged in pairs; the so-called coil pair. The coil pairs are distributed according to their number symmetrically around the periphery of the shaft. By using more than one coil pair, radial tolerances of the shaft can be compensated.

The present invention has recognized that a sensor operated per the magnetostrictive principle described above is superbly suited to a divided roll stabilizer.

In this refinement according to the invention, the sensor comprises the magnetically coded primary sensor and also the secondary sensor that can convert changes in the magnetic properties of the primary sensor into an electric signal.

The connecting part can be formed, for example, by a shaft or by a sleeve or by a flange that is magnetically coded; this coding can be performed in the way described above.

The secondary sensor can be formed as a passive element and can comprise coils that detect magnetic changes in the primary sensor and can convert these changes into an electric signal. This signal can be fed, for example, to a control device that is provided for activating the actuator. The secondary sensor can also be constructed as an active element.

The stabilizer part can be formed advantageously as a torsion bar spring, wherein the primary sensor lies directly in the flow of forces or load path of the torsion bar spring, that is, transmits the full torsion.

The secondary sensor can be arranged above the primary sensor, wherein this secondary sensor detects changes in the magnetic properties of the primary sensor. If the torsion bar springs are loaded under torsion, then the magnetically coded connecting part is likewise loaded with this torsion. Under this torsion, the field lines in the magnetically coded connecting part change, wherein the change is measured by the secondary sensor and can be converted into an electrical signal.

In one refinement according to the invention, the stabilizer parts are supported in stabilizer bearings and each provided with a connecting part for connecting to an actuator. It can be sufficient to code only one of the two connecting parts magnetically, so that the primary sensor is formed. The stabilizer bearing supports the stabilizer part on the vehicle body and allows rotational movements of the stabilizer part about the axis of torsion.

The otherwise provided connecting part can be produced from magnetostrictive material and can be magnetically coded and is thus suited according to the invention for a non-contact detection of an effective torsion. A separate primary sensor that changes its magnetic properties under a torsion is not needed.

The connection of the magnetically coded connecting part to the stabilizer part can be realized with a friction fit, by an interference fit, with a material fit, or with a non-positive fit.

If the connecting part is constructed as a flange, one option is for the flange to have a hollow construction. Such a flange is lighter by weight compared with solid flanges. The secondary sensor could be arranged in the hollow flange, so that additional installation space requirements for the secondary sensor are eliminated.

BRIEF DESCRIPTION OF THE DRAWINGS

The invention will be described in more detail below with reference to four figures. Shown are:

FIG. 4 is a perspective view of the embodiment according to FIG. 3.

DETAILED DESCRIPTION OF THE PREFERRED EMBODIMENTS

Figure 1:
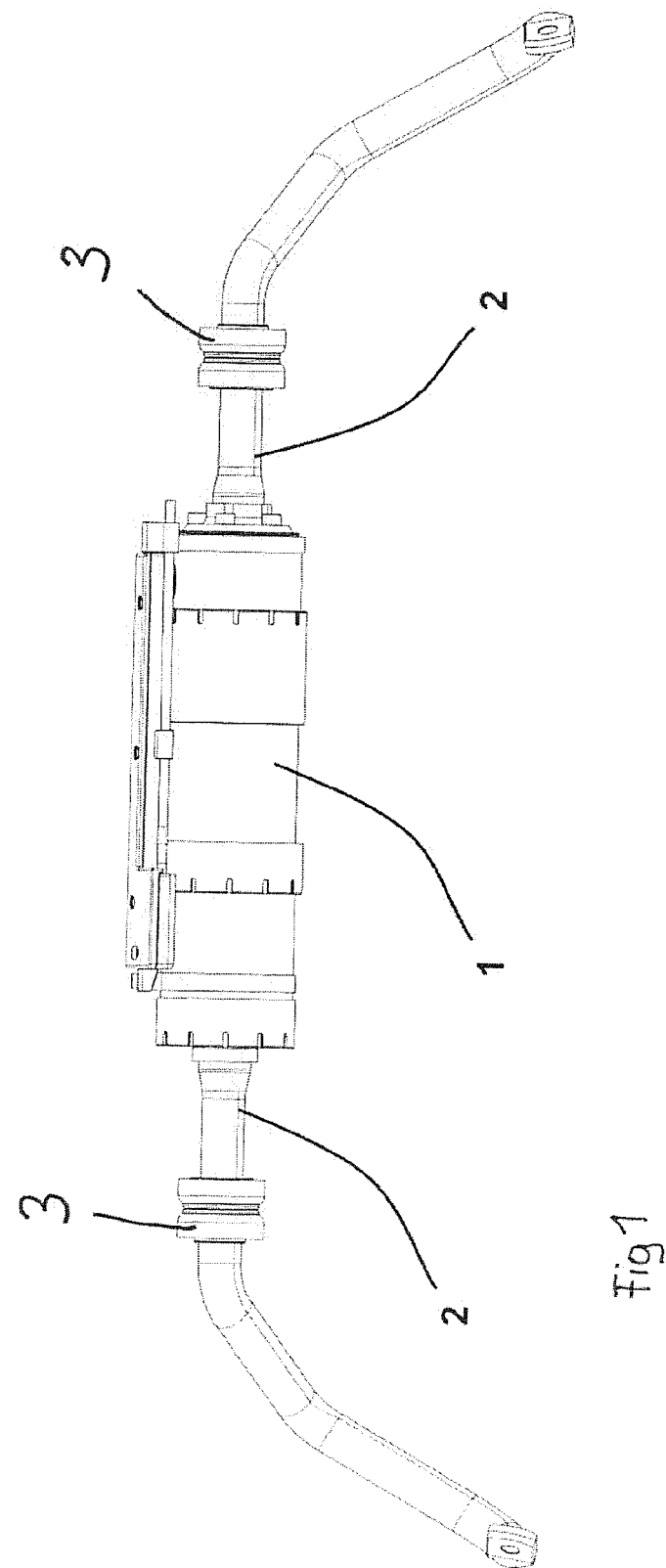
FIG. 1 is a view of a divided roll stabilizer according to the invention.

FIG. 1 shows a divided roll stabilizer according to the invention with a connected actuator 1. The actuator 1 is arranged effectively between two stabilizer parts 2a constructed as torsion bar springs 2. Both stabilizer parts 2a are supported so that they can rotate by means of a stabilizer bearing 3 on a vehicle body not shown here. The actuator 1 can have a motor with a connected gear, wherein an actuator housing can be connected to one stabilizer part 2a and an output shaft can be connected to the other stabilizer part 2a. Under activation of the actuator 1, the connected stabilizer parts 2a are loaded in torsion.

Figure 2:
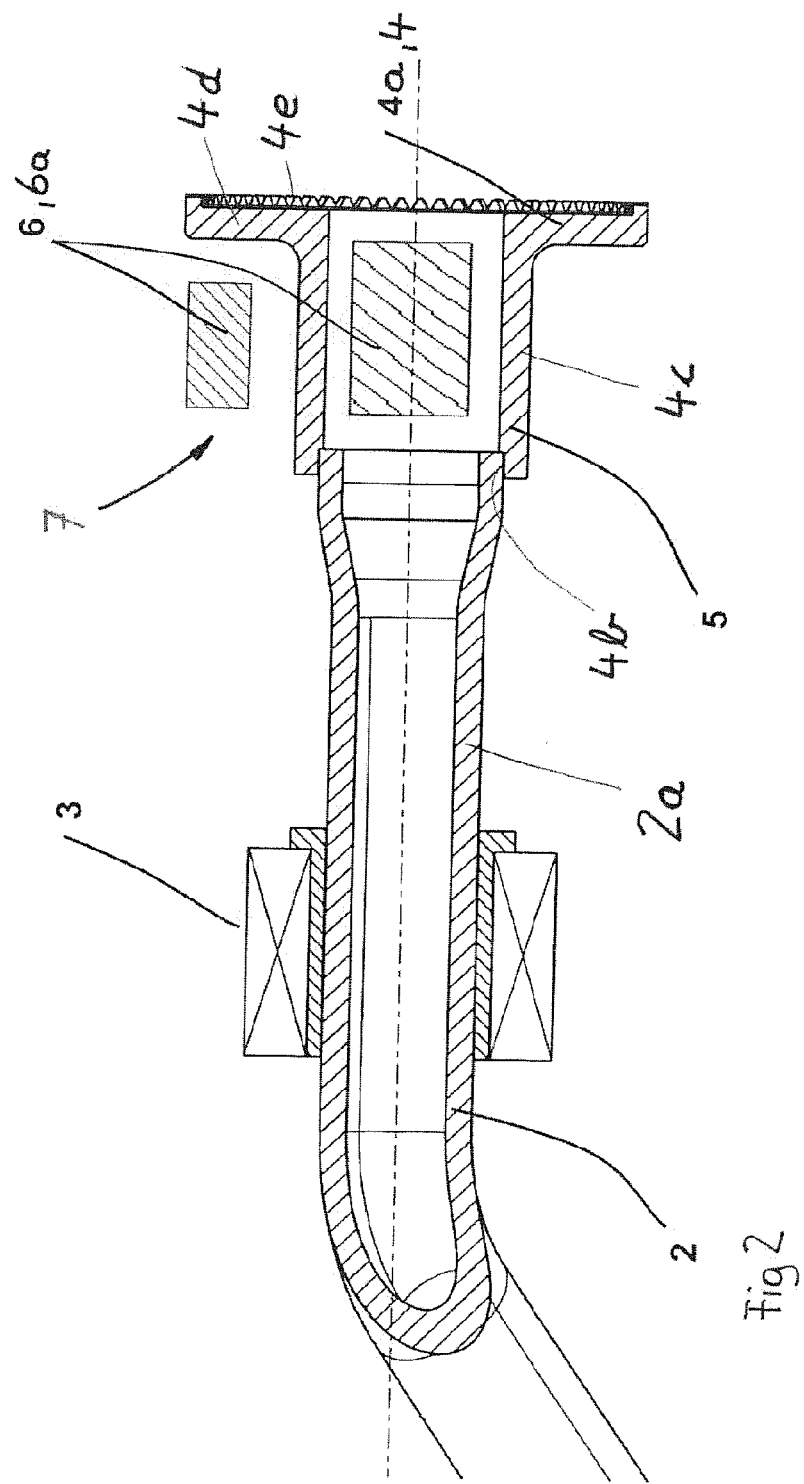
FIG. 2 is an enlarged section from FIG. 1.

FIG. 2 shows an enlarged section from FIG. 1.

A sensor 7 for non-contact measurement of the actuator moment has a magnetically coded primary sensor 5 and also a magnetic field sensor 6a called the secondary sensor 6. The actuator element is the torsion acting in the stabilizer parts 2a.

The stabilizer part 2a is provided on its end facing the—not shown—actuator with a connecting part 4a that is connected to the actuator 1 for transmitting the torsion. The connecting part 4a is constructed in the embodiment as flange 4.

The flange 4 is locked in rotation, on one side, to the stabilizer part 2a and, on the other side, to the actuator 1. The flange 4 can be screwed to the actuator 1 with screws; the flange 4 can also be connected to the actuator 1 with a material, friction, or force fit.

In the embodiment, the flange 4 has a hollow construction, wherein the stabilizer part 2a with a circular ring-shaped construction on its end engages in a ring-shaped projection 4b of the flange 4. The flange 4 and the stabilizer 2a are connected to each other with a material fit.

The flange 4 has a sleeve-shaped section 4c on whose axial end facing away from the ring-shaped projection 4b a radial rim 4d is formed integrally. The radial rim 4d is provided on its end facing the not-shown actuator with teeth 4e that engage with a positive fit in counter teeth provided on the actuator. The flange 4 is screwed to the actuator by means of not-shown screws, wherein the screws are guided through passage openings in the radial rim.

The flange 4 is made from magnetostrictive material and magnetically coded and forms the primary sensor 5. The primary sensor 5 transmits the full torsion of the roll stabilizer. It can be sufficient to code only the sleeve-shaped section 4c of the flange 4 magnetically.

The secondary sensor 6 is arranged in FIG. 2 alternatively inside and outside of the hollow flange 4. The secondary sensor 6 measures the change in the magnetic properties of flange 4 caused by the torsion of the primary sensor 5. Through the arrangement of the secondary sensor 6 inside the hollow flange, a space-saving arrangement and an effective protection of the sensor 7 is achieved.

Figure 3:
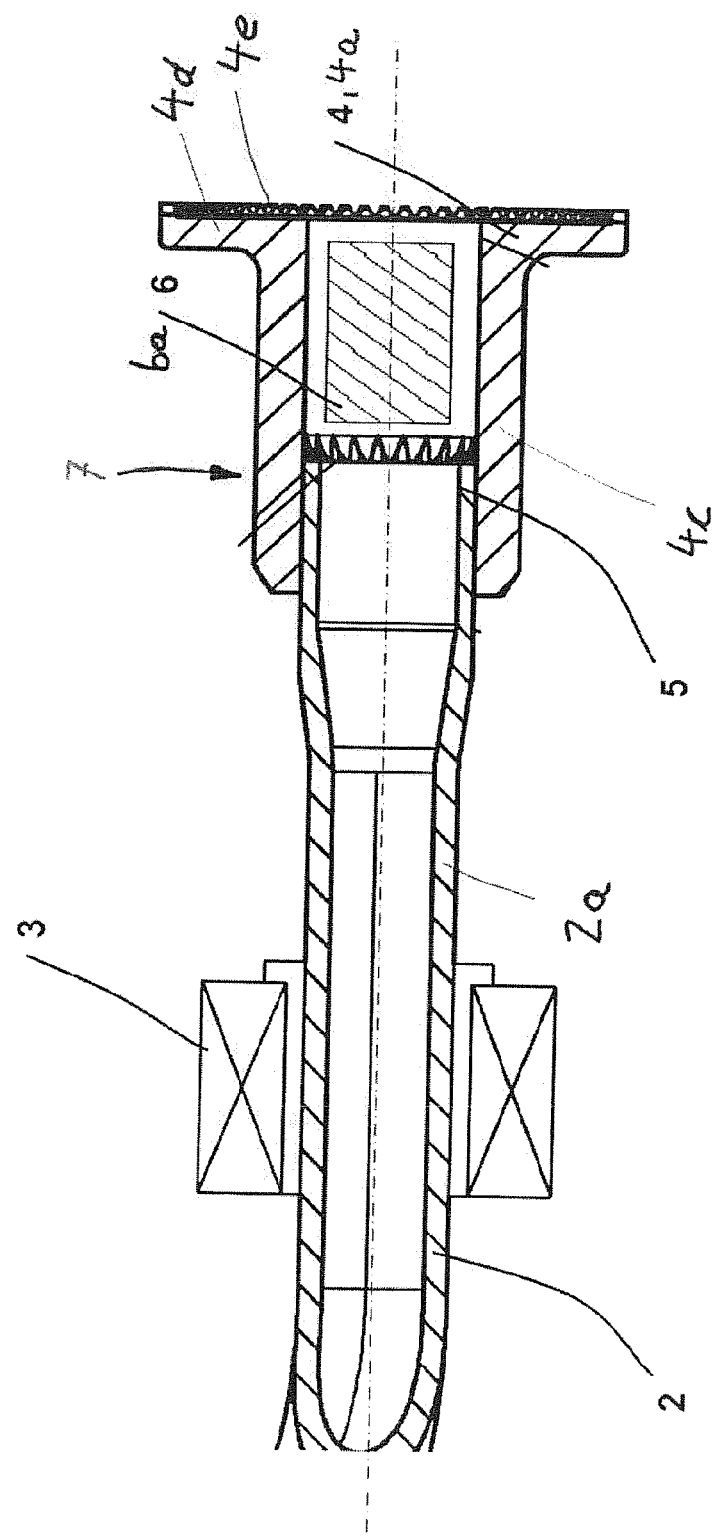
FIG. 3 is a view of an alternate embodiment according to the invention in a representation as in FIG. 2.

The divided roll stabilizer according to the invention shown in FIGS. 3 and 4 differs from the previously described stabilizer only in that instead of a material-fit connection between the flange 4 and the stabilizer part 2a, a positive-fit connection is provided. The secondary sensor 6 is arranged inside the hollow flange 4. The secondary sensor 6 can also be arranged radially outside of the hollow flange 4.

The modified hollow construction flange 4 has, on the inner periphery of the sleeve-shaped section 4c, an inner serrated profile 4f. The stabilizer part 2a has on its end facing the flange 4 an outer serrated profile 2b on its outer periphery. The stabilizer part 2a is inserted with this end into the radial flange 4, wherein the serrated profiles 2b, 4f engage one in the other in a positive fit for transmitting torques.

The primary sensors can be arranged for divided roll stabilizers according to the invention on only one of the two stabilizer parts 2a; it is possible, however, to provide both stabilizer parts 2a each with a primary sensor 5. Both connecting parts 4a connected to the stabilizer parts 2a could also be constructed as primary sensors 5, wherein, however, only one secondary sensor 6 is allocated to one of the two primary sensors 5. In this way, a difference in the connecting parts 4a into magnetically coded and magnetically not coded connecting parts 4a is eliminated.

LIST OF REFERENCE SYMBOLS

1 Actuator
2 Torsion bar spring
2a Stabilizer part
2b Outer serrated profile
3 Stabilizer bearing
4 Flange
4a Connecting part
4b Ring-shaped projection
4c Sleeve-shaped projection
4d Radial rim
4e Teeth
4f Inner serrated profile
5 Magnetically coded primary sensor
6 Secondary sensor
6a Magnetic field sensor
7 Sensor

The invention claimed is:

1. A divided roll stabilizer of a motor vehicle, comprising two stabilizer parts between which an actuator is adapted to be arranged for torsioning of the stabilizer parts, wherein at least one of the stabilizer parts is provided with a torsion transmitting connecting part for connecting the actuator, and the connecting part is magnetically coded, a sensor for non-contact measurement of a torsion acting in the stabilizer part is provided, the sensor utilizes the magnetically coded connecting part as a primary sensor and further comprises a magnetic field sensor as a secondary sensor that converts changes in a magnetic field of the primary sensor into an electrical signal, and the connecting part transmits a full torsion between the actuator and the connected stabilizer part.

2. The divided roll stabilizer according to claim 1, wherein the connecting part is locked in rotation on one side to the stabilizer part and is locked in rotation on the other side with the actuator.

3. The divided roll stabilizer according to claim 1, wherein the connecting part is made from ferromagnetic material.

4. The divided roll stabilizer according to claim 1, wherein the actuator is located between the two stabilizer parts for torsion of the stabilizer parts.

5. The divided roll stabilizer according to claim 1, wherein the connecting part includes a flange for connection to the actuator.

6. The divided roll stabilizer according to claim 1, wherein the magnetically coded connecting part has a hollow construction.

7. A divided roll stabilizer of a motor vehicle, comprising two stabilizer parts between which an actuator is adapted to be arranged for torsioning of the stabilizer parts, wherein at least one of the stabilizer parts is provided with a torsion transmitting connecting part for connecting the actuator, and the connecting part is magnetically coded, wherein a sensor for non-contact measurement of a torsion acting in the stabilizer part is provided, the sensor utilizes the magnetically coded connecting part as a primary sensor and further comprises a magnetic field sensor as a secondary sensor that converts changes in a magnetic field of the primary sensor into an electrical signal, wherein the stabilizer parts are each supported for rotation by a stabilizer bearing and are each provided with one of the connecting parts for connecting to the actuator, and at least one of the connecting parts forms the primary sensor.

8. The divided roll stabilizer according to claim 7, wherein the stabilizer parts are each provided with a magnetically coded connecting part for connecting to the actuator, and at least one of the two magnetically coded connecting parts forms the primary sensor.

9. A divided roll stabilizer of a motor vehicle, comprising two stabilizer parts between which an actuator is adapted to be arranged for torsioning of the stabilizer parts, wherein at least one of the stabilizer parts is provided with a torsion transmitting connecting part for connecting the actuator, and the connecting part is magnetically coded, wherein a sensor for non-contact measurement of a torsion acting in the stabilizer part is provided, the sensor utilizes the magnetically coded connecting part as a primary sensor and further comprises a magnetic field sensor as a secondary sensor that converts changes in a magnetic field of the primary sensor into an electrical signal, wherein the magnetically coded connecting part has a hollow construction and the secondary sensor is arranged in the hollow connecting part.

* * * * *